(12) United States Patent
Kalkan

(10) Patent No.: US 9,067,201 B2
(45) Date of Patent: Jun. 30, 2015

(54) NANOWIRE-NANOPARTICLE CONJUGATE PHOTOLYTIC FUEL GENERATORS

(75) Inventor: Ali Kaan Kalkan, Stillwater, OK (US)

(73) Assignee: The Board of Regents For Oklahoma State University, Stillwater, OK (US)

( * ) Notice: Subject to any disclaimer, the term of this patent is extended or adjusted under 35 U.S.C. 154(b) by 226 days.

(21) Appl. No.: 13/502,956

(22) PCT Filed: Oct. 21, 2010

(86) PCT No.: PCT/US2010/053584
§ 371 (c)(1),
(2), (4) Date: Apr. 19, 2012

(87) PCT Pub. No.: WO2011/050183
PCT Pub. Date: Apr. 28, 2011

(65) Prior Publication Data
US 2012/0205251 A1    Aug. 16, 2012

Related U.S. Application Data

(60) Provisional application No. 61/253,753, filed on Oct. 21, 2009.

(51) Int. Cl.
| | |
|---|---|
| *B01J 35/06* | (2006.01) |
| *B01J 19/12* | (2006.01) |
| *B01J 23/68* | (2006.01) |
| *C01B 3/02* | (2006.01) |
| *B01J 35/00* | (2006.01) |
| *B01J 37/03* | (2006.01) |
| (Continued) | |

(52) U.S. Cl.
CPC .............. *B01J 35/06* (2013.01); *B01J 23/6482* (2013.01); *B01J 23/682* (2013.01); *B01J 35/0013* (2013.01); *B01J 35/004* (2013.01); *B01J 35/006* (2013.01); *B01J 37/036* (2013.01); *C01B 3/042* (2013.01); *C25B 1/003* (2013.01); *Y02E 60/364* (2013.01); *Y02E 60/368* (2013.01)

(58) Field of Classification Search
CPC ........ B01J 35/06; B01J 37/036; B01J 23/682; B01J 35/0013; B01J 35/004; B01J 23/6482; B01J 35/006; C25B 1/003; C01B 3/042; Y02E 60/368; Y02E 60/364
USPC ........................................................ 422/186
See application file for complete search history.

(56) References Cited

U.S. PATENT DOCUMENTS

| | | | |
|---|---|---|---|
| 7,718,995 B2 * | 5/2010 | Kawashima et al. | ......... 977/742 |
| 2004/0095658 A1 | 5/2004 | Buretea et al. | |

(Continued)

OTHER PUBLICATIONS

Jang et al, "Fabrication of CdS nanowires decorated with TiO2 nanoparticles for photocatalytic hydrogen production under visible light irradiation," Int'l J. of Hydrogen Energy, vol. 33 (2008) pp. 5975-5980.*

(Continued)

*Primary Examiner* — Keith Hendricks
*Assistant Examiner* — Colleen M Raphael
(74) *Attorney, Agent, or Firm* — Fellers, Snider, Blankenship, Bailey & Tippens, P.C.; Terry L. Watt

(57) ABSTRACT

A method for generating hydrogen is disclosed. The method includes substantially submersing nanowires having metallic nanoparticles into water, exposing the water submerged nanowires to light, and collecting hydrogen gas produced by photolysis from the exposure to light.

17 Claims, 8 Drawing Sheets

(51) Int. Cl.
  *C01B 3/04* (2006.01)
  *C25B 1/00* (2006.01)
  *B01J 23/648* (2006.01)

(56) References Cited

U.S. PATENT DOCUMENTS

| | | | |
|---|---|---|---|
| 2004/0105810 A1 | 6/2004 | Ren et al. | |
| 2004/0217014 A1 | 11/2004 | Ovshinsky et al. | |
| 2006/0062902 A1 | 3/2006 | Sager et al. | |
| 2007/0020157 A1* | 1/2007 | Hyde | 422/186 |
| 2009/0032391 A1 | 2/2009 | Dopp et al. | |
| 2009/0054231 A1 | 2/2009 | Jurng et al. | |
| 2009/0145742 A1 | 6/2009 | Mirkin et al. | |
| 2009/0183994 A1 | 7/2009 | Misra et al. | |
| 2010/0051443 A1* | 3/2010 | Lee | 204/157.15 |
| 2010/0213046 A1* | 8/2010 | Grimes et al. | 204/157.52 |
| 2010/0239470 A1* | 9/2010 | Pham-Huu et al. | 422/186 |
| 2011/0053020 A1* | 3/2011 | Norton et al. | 977/700 |
| 2011/0206593 A1* | 8/2011 | Fahs et al. | 422/186 |
| 2011/0245074 A1* | 10/2011 | Smith et al. | 977/902 |
| 2011/0275011 A1* | 11/2011 | Zhu et al. | 977/762 |
| 2012/0125781 A1* | 5/2012 | Zhang et al. | 205/340 |

OTHER PUBLICATIONS

Ozbay, "Plasmonics: Merging Photonics and Electronics at Nanoscale Dimensions," Science v. 311, p. 189 (2006).*

Bao et al, "Highly Ordered Pt-loaded CdS Nanowire Arrays for photocatalytic hydrogen production under visible light," Chem. Lett. vol. 35, No. 3 (2006) pp. 318-319.*

Yu et al, "Fabrication and Characterization of Visible-Light-Driven Plasmonic Photocatalyst Ag/AgCl/TiO2 Nanotube Arrays," J. Phys. Chem. C 2009, vol. 113, issue 37, pp. 16394-16401.*

Saito et al, "Platinum plasmonic nanostructure arrays for massively parallel single-molecule detection based on enhanced fluorescence measurements," Nanotechnology vol. 22 (2011) 445708 (pp. 1-9).*

Peng et al, "Platinum Nanoparticle Decorated Silicon Nanowires for Efficient Solar Energy Conversion," Nano Letters 2009, vol. 9, No. 11 pp. 3704-3709.*

"PCT International Search Report, Application No. PCT/US2010/053584, mailed Dec. 28, 2010".

"PCT International Search Report—Written Opinion, Application No. PCT/US2010/053584, mailed Dec. 28, 2010".

Stuart, et al., "Enhanced Dipole-Dipole Interaction between Elementary Radiators Near a Surface—Abstract Only", 1998, pp. 5663-5666, vol. 80, Publisher: Physical Review Letters.

Hagglund, et al., "Enhanced charge carrier generation in dye sensitzed solar cells by nanoparticles plasmons—Abstract Only", 2008, vol. 92, No. 1, Publisher: Applied Physics Letters.

Aroutiounian, et al., "Metal oxide photoelectrodes for hydrogen generation using solar radiation-driven water splitting—Abstract Only", 2005, Publisher: Solar Energy.

Bard et al., "Artificial Photosynthesis: Solar Splitting of Water to Hydrogen and Oxygen", 1995, pp. 141-145, vol. 28, Publisher: American Chemical Socity, Published in: US.

A.J. Bard, "Photoelectrochemistry and heterogeneous photocatalysis at semiconductors", 1979, pp. 59-75, vol. 10, Publisher: J. Photochem.

Bolton, James R., "Solar Photoproduction of Hydrogen: A Review", 1996, pp. 37-50, vol. 57, No. 1, Publisher: Solar Energy.

Borgarello et al., "Photochemical cleavage of water by photocatalysis", 1981, pp. 158-160, vol. 289, Nature Jan. 15, 1981.

Borgarello, et al., "Sustained Water Cleavage by Visible Light—Abstract", 1981, J. Am. Chem. Soc. v. 103 p. 6324-6329.

Catchpole, et al., "Design principles for particle Plasmon enhanced solar cells", 2008, vol. 93, Publisher: Applied Physics Letters.

Duonghong, et al., "Dynamics of Light-Induced Water Cleavage in Colloidal Systems—Abstract Only", 1981, Publisher: J. Am. Chem. Soc.

Eurenius, et al., "Grating formation by metal nanoparticle mediated coupling of light into waveguided modes—Abstract Only", 2008, pp. 360-364, vol. 2, Publisher: Nature Photonics.

Fang, et al., "Remote excitation surface enhanced raman scattering using propagating Ag nanowire plasmons—Abstract Only", 2009, pp. 2049-2053, vol. 9, Publisher: Nano Letters.

Fujishima et al, "Electrochemical Photolysis of Water at a Semiconductor Electrode", 1972, pp. 37-38, vol. 238, Publisher: Nature Publishing Group.

Gratzel, Michael, "Photoelectrochemical Cells", 2001, pp. 338-344, vol. 414, Publisher: Macmillan Magazines Ltd.

Hagglund, et al., "Nanoparticle plasmonics for 2D-photovoltaics: Mechanims, optimizationi and limits—Abstract Only", 2009, pp. 11944-11957, vol. 17, No. 14, Publisher: Optics Express.

Hagglund, et al., "Electromagnetic coupling of light into a silicon solar cell by nanodisk plasmons—Abstract Only", 2008, vol. 92, No. 5, Publisher: Applied Physics Letters.

Halaoui, et al., "Increasing the Conversion Efficiency of Dye-Sensitized TiO2 Photoelectrochemical Cells by Coupling to Photonic Crystals—Abstract Only", 2005, pp. 6334-6342, vol. 109, No. 13, Publisher: J. Phys. Chem.

Huang, et al., "Nanowire waveguide made from extremely anisotropic metamaterials", 2008, Publisher: Phys. Rev.

Kalkan, A. Kaan, "Nanowire-nanoparticle conjugate photolytic device", 2012, pp. 159-167, vol. 1, Publisher: ICE.

Kalkan, et al., "Electroless synthesis of Ag nonoparticles on deposited nonostructured Si films—Abstract Only", 2005, pp. 20779-20785, vol. 109, No. 44, Publisher: The Journal of Physical Chemistry B.

Kalkan, et al., "Laser-activated surface-enhanced Raman scattering substrates capable of single molecule detection—Abstract Only", 2006, vol. 89, No. 23, Publisher: Applied Physics Letters.

Knight, et al., "Nanoparticle mediated coupling of light into a nanowire—Abstract Only", 2007, pp. 2346-2350, vol. 7, No. 8, Publisher: Nano Letters.

Kung, et al., "Semiconducting oxide anodes in photoassisted electrolysis of water—Abstract Only", 1977, pp. 2463-2469, vol. 48, No. 6, Publisher: Journal of Applied Physics.

Leventis, et al., "Polymer nanoencapsulated mesoporous vanadia with unusual ductility at cryogenic temperatures—Abstract Only", 2008, pp. 2475-2482, vol. 18, Publisher: J. Mater. Chem.

Lim, et al., "Light Scattering into silicon-on-insulator waveguide modes by random and periodic gold nanodot arrays—Abstract Only", 2009, vol. 105, Publisher: Journal of Applied Physics.

Matheu, et al., "Metal and dielectric nanoparticles scattering for improved optical absorption in photovotaic devices", 2008, vol. 93, Publisher: Applied Physics Letters.

Mavroides, J.G., "Electrode materials for the photoelectrolysis of water—Abstract Only", 1978, pp. 1379-1388, vol. 13, No. 12, Publisher: Materials Research Bulletin.

Nakayama, et al., "Plasmonic nanoparticle enhanced light absorption in GaAs solar cells—Abstract Only", 2008, vol. 93, Publisher: Applied Physics Letters.

Oulton, et al., "A hybrid plasmonic waveguide for subwavelength confinement and long-range propagation—Abstract", 2008, pp. 496-500, vol. 2, Publisher: Nature Photonics.

Panoiu, et al., "Enhanced optical absorption for photovoltaics via excitation of waveguide and plasmon-polartion modes—Abstract Only", 2007, pp. 2825-2827, vol. 32, No. 19, Publisher: Optics Letters.

Rockstuhl, et al., "Absorption enhancement in solar cells by localized Plasmon polaritons—Abstract Only", 2008, vol. 104, No. 12, Publisher: Journal of Applied Physics.

Sato, et al., "Photodecomposition of water over Pt/TiO2 Catalysts—Abstract Only", 1980.

Schrauzer, et al., "Photolysis of Water and Photoreduction of Nitrogen on Titanium Dioxide—Abstract", 1977, Publisher: J. Am. Chem.

Stuart, et al., "Absorption enhancement in silicon-on-insulator waveguides using metal island films—Abstract Only", 1996, vol. 69, No. 16, Publisher: Applied Physics Letters.

Stuart, et al., "Island size effects in nanoparticle-enhanced photodetectors—Abstract Only", 1998, vol. 73, Publisher: Applied Physics Letters.

(56) References Cited

OTHER PUBLICATIONS

Sundararajan, et al., "Nanoparticle-induced enhancement and suppression of photocurrent in a silicon photodiode—Abstract Only", 2008, pp. 624-630, vol. 8, Publisher: Nano Letters.

Varghese, et al., "Water-photolysis properties of micron-length highly-ordered titania nanotube-arrays—Abstract Only", 2005, Publisher: J. Nanoscience and Nanotechnology.

Voss, et al., "The influence of local heaing by nonlinear pulsed laser excitation on the transmission characteristics of ZnO nanowire waveguide—Abstract", 2009, vol. 20, No. 9, Publisher: Nanotechnology.

Wang, et al., "Analysis of modes in a free-standing nanowire cavity by FDTD simulation—Abstract Only", 2005, pp. 92-95, vol. 1, No. 2, Publisher: Optoelectronics Letters.

Wrighton, et al., "Photoassisted Electrolysis of Water by Irradiation of a Titanium Dioxide Electrode", 1975, pp. 1518-1522, vol. 72, No. 4, Publisher: Proc. Nat. Acad. Sci.

Zhou, et al., "Direct observation of ballistic and drift carrier transport regimes in InAs nanowires—Abstract Only", 2006, Publisher: Applied Physics Letters.

G. Campet, M.P. Dare-Edwards, A. Hamnett, and J.B. Goodenough, "New Semiconducting Anodes for The Photo-Oxidation of Water", 1980, Publisher: Nouveau Journal De Chimie—New Journal of Chemistry 4, 501.

R. Eisenberg, "Rethinking Water Splitting", Publisher: Nature 324,44, Apr. 3, 2009.

C.A. Grimes, S. Ranjan, and O.K. Varghese, "Light, Water, Hydrogen", 2008, Publisher: Springer Science + Business Media, LLC, New York, NY 10013, USA (cover and copyright page only).

K. Kalyansundaram, "Photoelectrochemical Cell Studies With Semiconductor Electrodes—A Classified Bibliography (1975-1983)", 1985, Publisher: Solar Cells 15, 93.

K. Rajeshwar, R. McConnell, and S. Licht, "Solar Hydrogen Generation: Toward a Renewable Energy Future", 2008, Publisher: Springer Science + Business Media, LLC, New York, NY 10013, USA (cover and copyright page only).

L. Schlapbach, "Hydrogen-fuelled Vehicles", 2009, Publisher: Nature 460, 809.

H. Van Damme and W. Keith Hall, "On the Photo-Assisted Decomposition of Water at The Gas-Solid Interface on TiO2", 1979, Publisher: Am. Chem. Soc. 101, 4373, Jul. 18, 1979.

G.S. Zakharova, V.L. Volkov, CH. Taschner, I. Hellman, A. Leonhardt, R. Klingeler, and B. Buchner, "Synthesis and Characterization of V3O7-H2O Nanobelts", 2009, Publisher: Solid State Communications 149, 814.

\* cited by examiner

NANOWIRE-NANOPARTICLE CONJUGATE PHOTOLYTIC FUEL GENERATORS

CROSS REFERENCE TO RELATED APPLICATIONS

This application claims the priority of U.S. Provisional Patent Application No. 61/253,753 entitled "NANOWIRE-NANOPARTICLE CONJUGATE PHOTOLYTIC FUEL GENERATORS," filed Oct. 21, 2009, the contents of which are hereby incorporated by reference.

FIELD OF THE INVENTION

This disclosure relates to hydrogen generation in general and, more particularly, to hydrogen generation from photolysis of water.

BACKGROUND OF THE INVENTION

By 2030, global demand for energy is projected to increase by 50%. There is also growing awareness that the Earth's oil reserves may run out during the present century. Therefore, an energy shortage is likely to emerge, unless some renewable energy source replaces the fossil fuels in the next few decades. Fortunately, the Sun exposes the Earth with 10,000 times more power than the world's population consumes today. However, nourishing our civilization from this gigantic energy reservoir remains a challenge. For instance, at its maximum value of ~1 kW/m$^2$, solar irradiation incident on a car or plane is too low to power these vehicles. Therefore, for mobile applications, storage of solar energy in a fuel seems to be the inevitable choice. Indeed, by burning fossil fuels, we release the solar energy harnessed by biological photosynthesis millions of years ago.

Current solar panels may be utilized to charge batteries so that the solar power can be concentrated and stored. However, this presents its own set of challenges, including high startup cost and residual toxicity of materials used to create batteries. Additionally, chemical batteries have a limited service life and are relatively heavy for the amount of power they can provide relative to combustible fuels currently available. This results in limited range and usefulness of battery power for transportation use.

The hydrogen molecule, $H_2$, is the cleanest and smallest carrier of chemical energy, yet it has the highest energy content per unit weight among all fuels: 52,000 Btu/lb, which is three times that of gasoline. $H_2$ can be directly utilized as fuel in internal combustion engines for transportation, or for generation of electric power in fuel cells. $H_2O$ being the final product, no pollutants or greenhouse gases are produced. Indeed, hydrogen-powered buses and prototype $H_2$-filling stations are already in service in Nagoya, Japan and Berlin, Germany.

Solar energy can be stored as chemical energy in $H_2$ by photolysis of water: dissociation of $H_2O$ to $H_2$ and $O_2$ by photogenerated electron/hole pairs. In particular, significant research activity was stimulated towards photolytic cells producing hydrogen gas in 1972, when Fujishima and Honda demonstrated water could be split to hydrogen and oxygen under sunlight (photolysis) using an n-type titania electrode. At a solar intensity of 1 kW/m$^2$ (maximum in the United States), and collector area of 1 mile square, a "photolysis farm" employing 10% conversion efficiency photolytic cells, should deliver $H_2$ at a rate of more than 100 tons a minute.

Since the discovery of Fujishima and Honda (i.e., for almost 40 years), however, a stable photolytic device with an energy conversion efficiency of more than few percent could not be demonstrated. The realization of an efficient and stable photolytic energy conversion device is challenged by a number of requirements: i) efficient channeling of photogenerated electrons and holes to redox reactions at the interfaces; ii) efficient absorption of sunlight; iii) avoidance of photo-oxidation of the semiconductor electrode. For example, although the first photolytic cell was demonstrated with titania, which meets the first and last requirements, it can absorb only the ultraviolet portion of the sunlight due to its large band gap (i.e., 3.0 eV for rutile). On the other hand, silicon meets requirements (i) and (ii), but it undergoes photo-oxidation.

What is needed is a system and method for addressing the above and related issues.

SUMMARY OF THE INVENTION

The invention disclosed and claimed herein, in one aspect thereof, comprises a method of generating hydrogen. The method includes substantially submersing nanowires having metallic nanoparticles into water, exposing the water submerged nanowires to light, and collecting hydrogen gas produced by photolysis from the exposure to light. The nanowires may comprise a semiconductor, which may be vanadium, and may be prepared by supercritical drying of vanadia gel. The metallic nanoparticles may comprise silver, copper, gold, or platinum.

The invention disclosed and claimed herein, in another aspect thereof, comprises a system for production of hydrogen gas via hydrolysis. The system includes a plurality of nanowires, metallic nanoparticles decorating the nanowires, and a water-based medium surrounding the nanowires. The metallic nanoparticle decorated nanowires in the surrounding water-based medium are exposed to light resulting in nanoparticle mediated coupling of light into waveguide modes in the nanowires creating electron/hole pairs. The holes split water molecules into oxygen molecules and hydrogen ions. Electrons are captured by the metallic nanoparticles and transported to hydrogen ions reducing them to hydrogen gas. The nanowires may be semiconductor nanowires and may comprise vanadium. The metallic nanoparticles may comprise gold, silver, copper, or platinum.

DETAILED DESCRIPTION OF THE PREFERRED EMBODIMENTS

It takes 1.23 eV to cleave a water molecule. However, water is transparent to near infrared as well as visible radiation, and can only absorb photons in excess of 6.47 eV (i.e., in ultraviolet). However, photolysis of water can be driven by visible light photons, if they are first absorbed by a molecule or semiconductor and the energy is transferred to electron-hole ($e^-$ and $p^+$, respectively) pairs. This reaction is governed by the equation:

$$2\hbar\omega \rightarrow 2e^- + 2p^+,$$

where $\hbar\omega$ is the energy of a single photon, $\hbar$ and $\omega$ being the angular frequency of the photon and Planck's constant, respectively. Subsequently, the holes generated in the valence band of the semiconductor oxidize water, following the equation:

$$2p^+ + H_2O \rightarrow \tfrac{1}{2}O_2 + 2H^+$$

while the photogenerated electrons are channeled to the cathode to reduce $H^+$ as $$2e^- + 2H^+ \rightarrow H_2$$

Hence, the overall reaction is the splitting of water to oxygen and hydrogen according to $$2\hbar\omega + H_2O \rightarrow \tfrac{1}{2}O_2 + H_2$$

Both of the redox reactions above involve charge transfer across a solid-electrolyte interface. The mechanism of the charge transfer is tunneling or phonon assisted tunneling. The former has an appreciable probability only between states of the same energy. Whereas, the latter is probable from higher to lower energy, creating phonons, through an intermediate localized (e.g., defect) state. Hence, a major challenge in an efficient photolysis cell, is the wise engineering of charge transfer pathways, which are favorable for electron/hole pairs. Otherwise, electron/hole pairs can choose the competing path of recombination, dumping their energy into heat or luminescence. Another undesirable competing path is the oxidation of the semiconductor.

Figure 1:
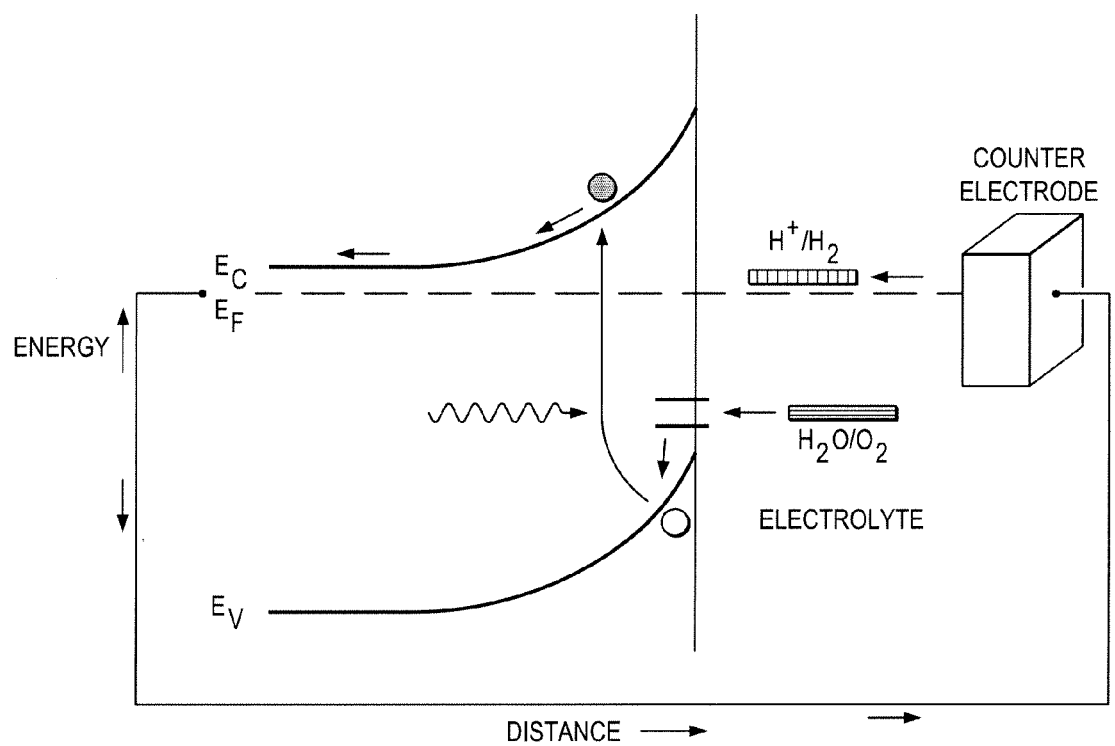
FIG. 1 is an energy band diagram of an ideal photolysis cell.

FIG. 1 illustrates electron energy band diagram of what is considered by the photolysis literature as the "ideal photolysis cell". The arrows indicate the direction of electron flow. The energy bands in the semiconductor are bent due to lining up of the Fermi levels, EF, in the semiconductor and solution ($H^+/H_2$). Hence, the semiconductor-electrolyte interface is equivalent to a Schottky barrier. Here, the bending is in the favorable direction, where the built-in field pushes a photogenerated hole towards the electrolyte for the oxidation reaction, while the electron is swept away in the opposite direction to be channeled to the metal. This way, the recombination of the electron/hole pair is also impeded. Finally, the electrons leave the semiconductor through an ohmic contact, which was indium in the original demonstration by Fujishima and Honda. Subsequently, the electrons are conducted to the counter electrode through a metal wire.

The desired band bending in FIG. 1 is attained if the work function of the n-type semiconductor is less than that of $H^+/H_2$, which is 4.5 eV below the vacuum level for pH=0. For a band bending of 0.5 eV, the semiconductor work function therefore should be 4.0 eV. Shown in the same energy diagram, is $H_2O/O_2$ located 1.23 eV below $H^+/H_2$. For the oxidation reaction to be favorable, the valence band edge, $E_v$, should align with $H_2O/O_2$ or lie lower. In the latter case, surface states located in the gap (i.e., defects) mediate the phonon assisted tunneling as also depicted in the Figure. Although these states facilitate photolysis in terms of charge transfer, they may also be harmful if they also assist in electron-hole recombination.

With a nanowire radius of less than 10 nm, in the embodiments described in the present disclosure, there will not be considerable band bending. Further, the electron and hole energies can be in excess of band edges if the ballistic carrier transport dominates and thermalization is absent.

Noble metal nanoparticles allow for a fascinating phenomenon; the metal electrons can collectively couple with an incident electromagnetic field, once the wavelength is ~10 or more times larger than the nanoparticle size. These modes, known as localized surface plasmons (LSP), indeed strongly couple with incident photons, and concentrate them in the close vicinity of metal nanoparticles. As an example, these enhanced near fields lead to dramatically enhanced optical signals from molecules adsorbed on these particles. In the specific case of surface-enhanced Raman scattering (SERS) for example, the signal gains can be as gigantic as $10^{12}$ enabling detection and imaging of single molecules.

In 1996, yet another attribute of LSP's was discovered. Stuart and Hall demonstrated that metal nanoparticle layers can couple incident light into the waveguide modes of a thin Si film (i.e., 160 nm thick) on-insulator detector, leading to increased optical absorption. Interestingly, the observed enhancement peaked at a certain wavelength, which was different than the LSP resonance wavelength. Hence, the enhancement was not due to LSP modes directly. Indeed, the enhancement peak showed negligible variation from Au to Ag to Cu nanoparticles. In contrast, the LSP wavelengths for these three metals differ significantly. Stuart and Hall, on the other hand, observed a trend between the enhancement and LSP wavelength. They found that the enhancement factor increased as the LSP wavelength and the wavelength of peak enhancement came closer. These observations strongly suggested that the enhancement in absorption was due to coupling of light into a waveguide mode mediated by LSP modes. The present disclosure provides physical mechanisms, structural architecture, and fabrication technique for the realization of a novel fuel-generating (e.g., hydrogen) photolytic device. In one embodiment, a device consists of a low band gap oxide semiconductor nanowire decorated with metal nanoparticles. The technology offers low-cost, high photolytic conversion energy and stability by making use of multifunctional nanostructures with unique electronic, photonic, and plasmonic attributes at the nanoscale.

Figure 2:
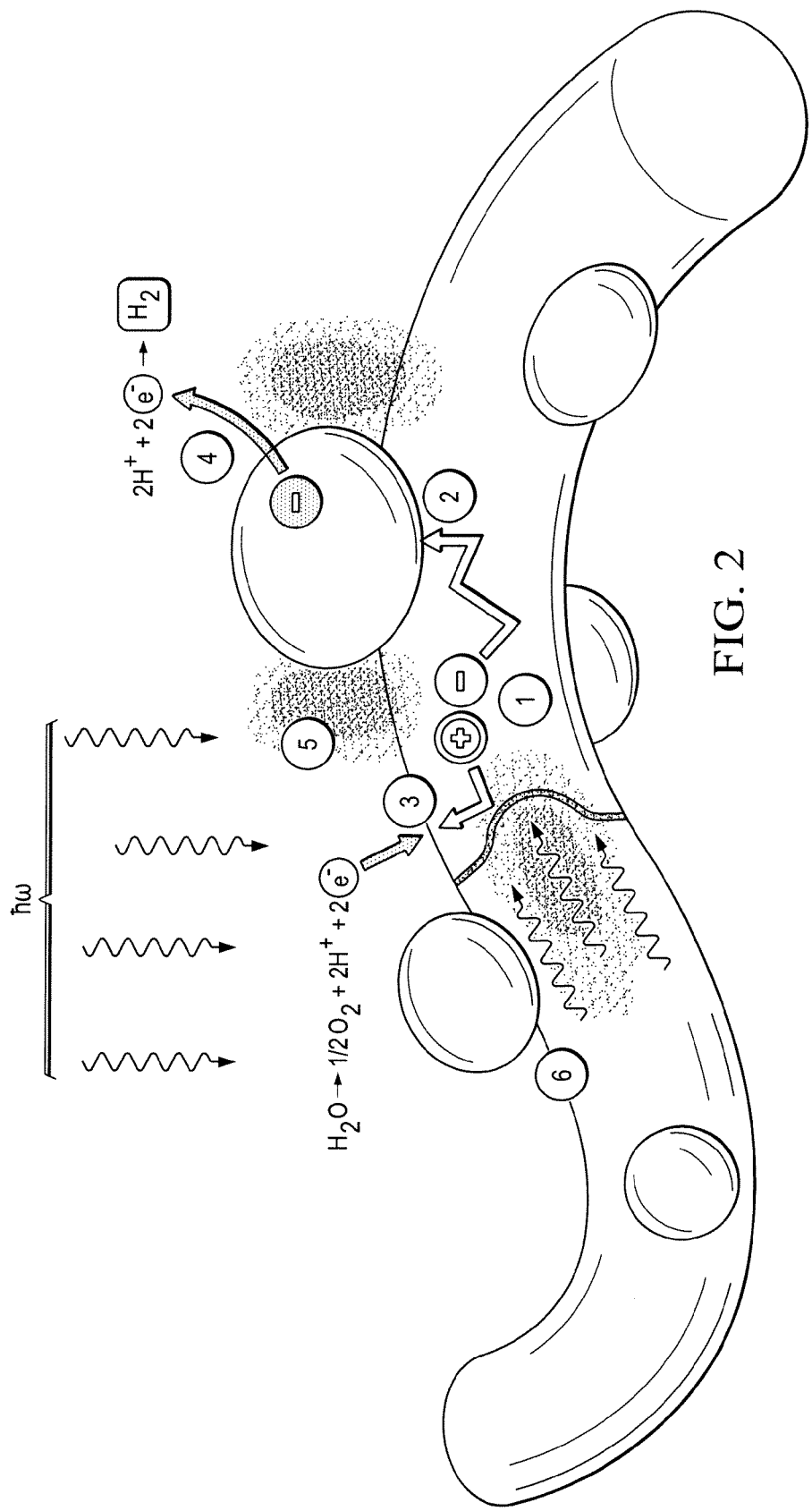
FIG. 2 is a schematic diagram illustrating the operation of one embodiment of a semiconductor nanowire—metal nanoparticle conjugate system according to the present disclosure.
Figure 3:
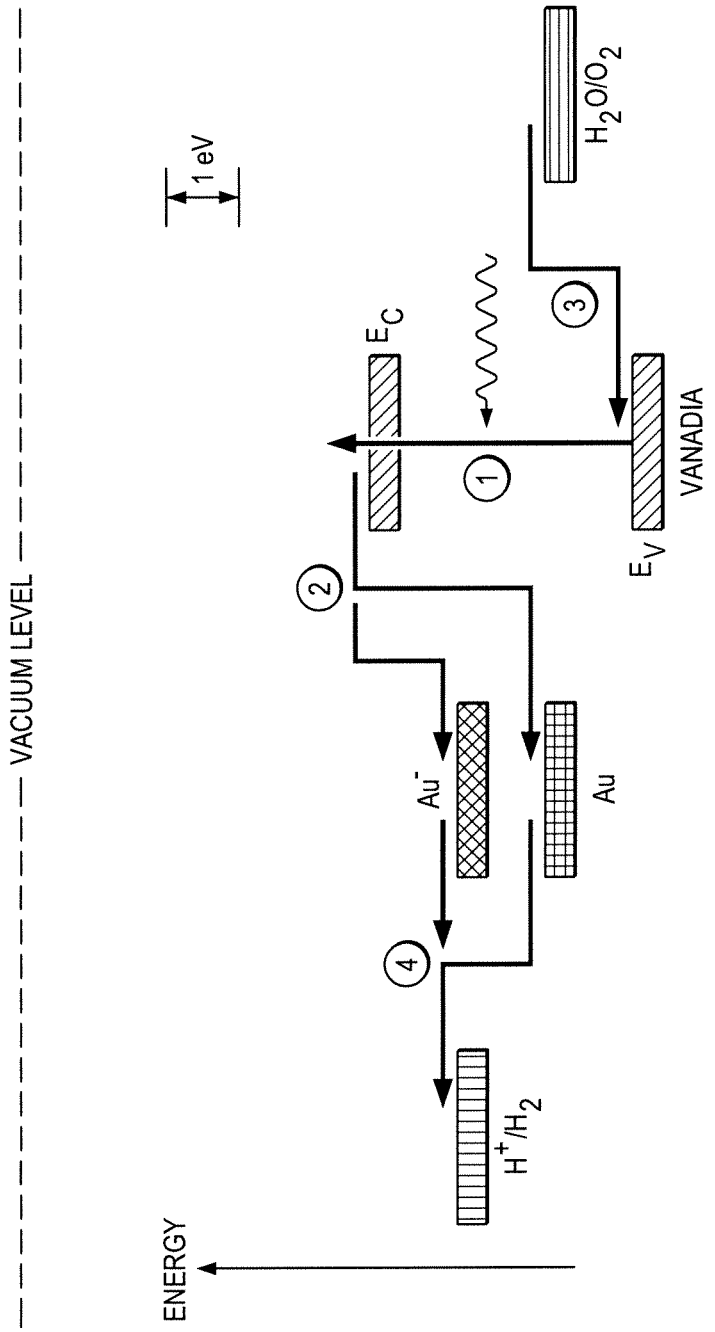
FIG. 3 is an energy diagram complementing FIG. 2 illustrating the electron excitation and transfer steps during the photolytic activity of the nanowire-nanoparticle conjugate device.

Referring now to FIG. 2, a schematic diagram illustrating the operation of one embodiment of a semiconductor nanowire—metal nanoparticle conjugate system according to the present disclosure is shown. The present embodiment of the disclosed nanowire-nanoparticle conjugate device exploits a fortunate combination of effects or mechanisms unique to its structure. FIG. 2 illustrates the essential electron excitation and transfer steps (steps 1 to 6) and electron states in geometrical representation. FIG. 3 is the complementary description in an energy diagram representation. The energy levels are drawn to scale and an energy scale bar is provided. In both representations, the steps are numbered the same. Below is the description of the steps.

(1) Photogeneration of the electron-hole pair in the vanadia nanowire.

(2) Capture of electron by high work function metal nanoparticle (e.g., Au). This mechanism, being absent in bulk photolytic cells, facilitates efficient separation of electron-hole pairs. Nanoparticles collect the photogenerated electrons efficiently by virtue of their being a high work function metal before channeling them to the reduction reaction. This aspect differs from having a counter metal electrode (cathode) in a bulk photolytic cell, where a semiconductor/cathode interface is absent. The energy offset at the semiconductor/metal interface serves as a check-valve and permits the passage of the electrons from semiconductor to metal only.

(3) The hole is conducted to the nanowire/water interface, where it oxidizes water. Equivalently, the hole steals an electron from the water. This reaction replenishes the $H^+$ and the electron needed for the reduction reaction, which produces $H_2$. Here the $H_2O/O_2$ is located 5.73 eV below the vacuum level. Assuming the conduction band edge of vanadia is ~4 eV below the vacuum level as in other transition metal oxides and having measured the band gap as ~2.2 eV, the valence band edge is estimated to be at ~6.2 eV below the vacuum level. Although $H_2O/O_2$ and $E_v$ are offset by 0.2-0.3 eV, the electron transfer can occur through the surface states by dissipation of the excess energy to a phonon as argued in the photolysis literature.

By virtue of the wire diameter being at the nanoscale, there is efficient transport of the photogenerated careers to nanowire/metal and nanowire/electrolyte interfaces for the reduction and oxidation reactions, respectively. Because redox reactions occur at the nanowire and nanoparticle surfaces, high surface to volume nature of these structures at the nanoscale increases the fuel production rate.

(4) Metal nanoparticles also serve as the cathodes for channeling the electrons to $H^+$. From FIG. 3, this step is inferred to be not efficient for Au due to the energy offset. Namely, $H^+/H_2$ and Au Fermi level are 4.5 and 5.3 eV below the vacuum level. Here, the electron transfer requires energy intake, which is difficult to happen with phonon absorption (i.e., Boltzmann factor<<1). However, the proof of concept of the present disclosure clearly shows photolysis and hydrogen production. The Inventor explains this unexpected success in terms of a novel property of the metal nanoparticles. In case electrons are not efficiently channeled to $H^+$, they accumulate in the Au nanoparticle and charge it negatively. Subsequently, the increasing negative electric potential will align the Fermi level in Au with $H^+/H_2$ resulting in efficient channeling of electrons. This self-alignment of energy levels is the attribute of ultralow nanoparticle capacitance, where a charge of countable electrons can induce a potential up to 1 V or more.

Apart from the novel electronic steps described above, FIG. 2 also illustrates two other novel mechanisms regarding efficient absorption of electromagnetic radiation in the semiconductor nanowires. These mechanisms are illustrated as (5) and (6) in FIG. 2.

(5) In addition to functioning as cathodes, plasmonic metal nanoparticles decorating the nanowires serve as near-field concentrators enhancing absorption of light in the semiconductor nanowire.

(6) The plasmonic nanoparticles also couple the incident radiation into the waveguide modes of the nanowires in the direction of the wire axis, maximizing optical absorption. This mechanism of light-trapping has great potential in benefiting nanowire based photolytic devices. Once the incident radiation is coupled into waveguide modes propagating in the direction of nanowire axis, the dramatic gain in optical path length inside the semiconductor (i.e., along the nanowire length rather than width) ensures efficient light absorption.

In one embodiment, the decoration of nanowires with plasmonic nanoparticles may be accomplished by an exposure of the nanowires to a metal salt solution. In other words, the semiconductor nanowire may be multifunctional, and they may as well serve as a reducing agent for reduction synthesis of the metallic nanoparticles. As recently demonstrated by the Inventor, $V_3O_7.H_2)$ nanowires can reduce $Ag^+$ and $Au^+$ ions leading to the formation of metal nanoparticles attached to them. This simplicity translates to low cost in fabrication.

Because redox reactions occur at the nanowire and nanoparticle surfaces, high surface to volume nature of these structural components at the nanoscale increases the fuel production rate. Further, photogenerated electrons and holes have to be transported from where they are generated in the nanowire to the nanowire/metal and nanowire/electrolyte interfaces for the reduction and oxidation reactions, respectively. Therefore, length scale of the wire diameter being at the nanoscale, renders the charge transfer efficient. In particular, a new mode of transport, namely ballistic transport, takes place for transportation distances less than the electron mean free path. In this new regime, no thermalization of the photogenerated electrons to the conduction band edge of the semiconductor occurs, before they reach the nanowire-metal interface. Similar argument can be iterated for the photogenerated holes. Thereby, more efficient channeling of the photogenerated electrons and holes to the corresponding redox reactions is enabled.

The present disclosure enables an efficient photolytic system based on nanoelectronics and nanophotonics. When the nanowire diameter approaches to electron mean free path, a new regime of charge transport, namely ballistic transport, takes place that increases the conversion energy. Nanoparticle-mediated coupling of incident radiation to nanowire waveguide modes is also contemplated. In one embodiment, the present disclosure teaches a materials architecture consisting of nanowires and nanoparticles only. Both material components are multifunctional as well as optically and electronically coupled. The technology to be developed is low cost, because all fabrication steps are based on solution synthesis that can be carried out to vast quantities.

In one working example given below, the system employs a low bandgap oxide semiconductor, $V_3O_7.H_2O$. The low band gap of $V_3O_7.H_2O$ ensures efficient absorption of visible light with no sacrifice in stability (i.e., no photocorrosion).

Nanowire Synthesis

Figure 4:
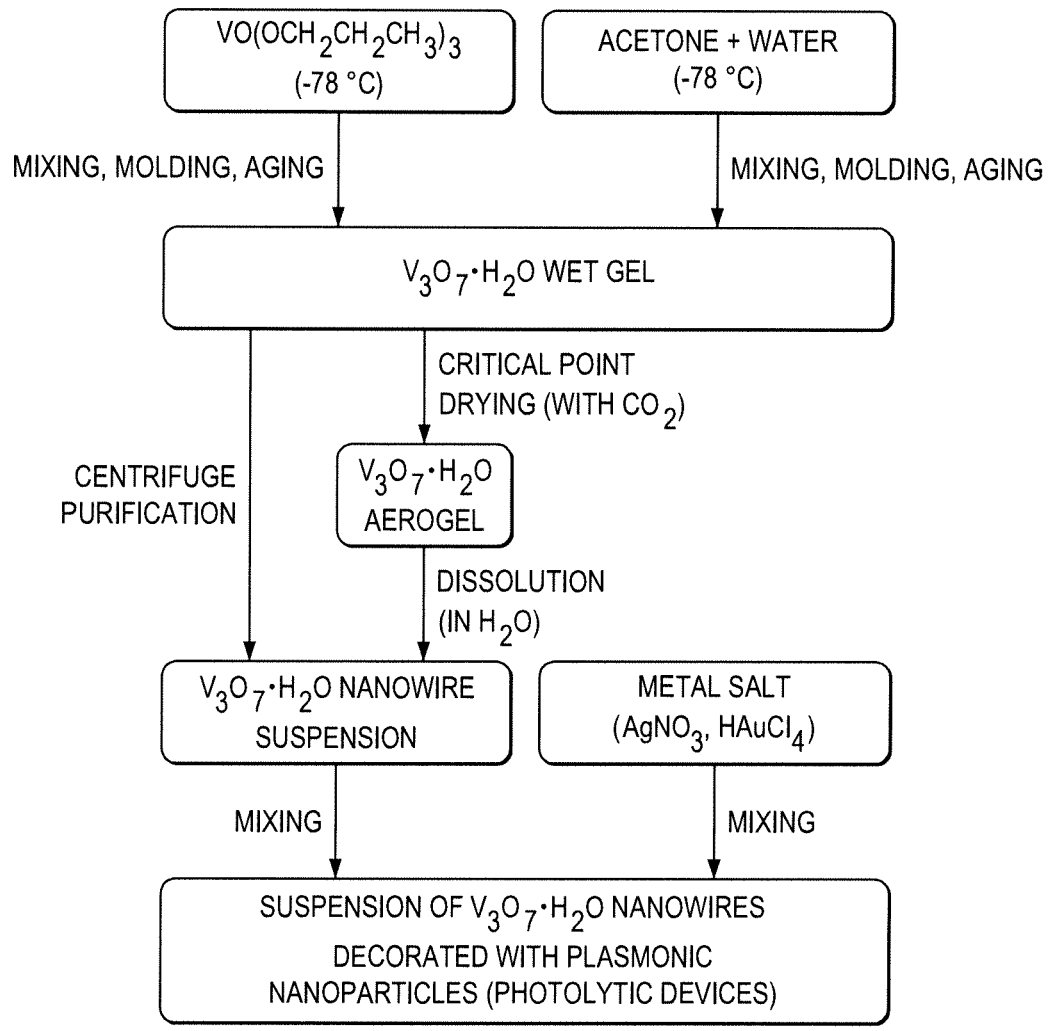
FIG. 4 is a flow chart of one embodiment of a process of vanadia aerogel preparation and nanoparticle decoration.

Although the nanowires of the present disclosure are not limited to a particular semiconductor, the current example is accomplished by utilization of $V_3O_7.H_2O$ nanowires. Additionally, in some embodiments, other structures such as carbon nanotubes, or nanofibers, may be utilized. In the present example, $V_3O_7.H_2O$ nanowires were prepared by supercritical drying of wet vanadia gels obtained via methods known in the art. In one embodiment, as shown in FIG. 4 a mixture of 5.58 mL of deionized water and 11.34 mL of acetone is added to 2.4 mL of vanadium (V) tripropoxide, $VO(OCH_2CH_2CH_3)_3$. In order to slow down the gelation process, solutions are cooled in an ice bath until ice appeared in water/acetone solution and vanadium (V) tripropoxide became more viscous. Prior to the mixing, water/acetone solution is shaken vigorously until ice chunks disappear.

The solution is then added into vanadium (V) tripropoxide at once in order to initiate the gelation. In contrast to methods known in the art, the obtained mixture was not shaken. The mixture was then transferred to the sealed molds. The wet gels were aged for five days. After aging, gels are washed with anhydrous acetone by changing acetone once every 24 hours for four times. Finally, the $V_3O_7.H_2O$ gel was supercritically dried with $CO_2$ at 40° C. and 1200 Psi.

The $V_3O_7.H_2O$ gel is dissolved in de-ionized (DI) water to a suspension of nanowires prior to nanoparticle synthesis. Although supercritical drying may be replaced by ordinary drying of acetone in ambient conditions, the former provides the most efficient extraction of residual byproducts from the gelation reaction.

Nanoparticle Synthesis

Figure 5:
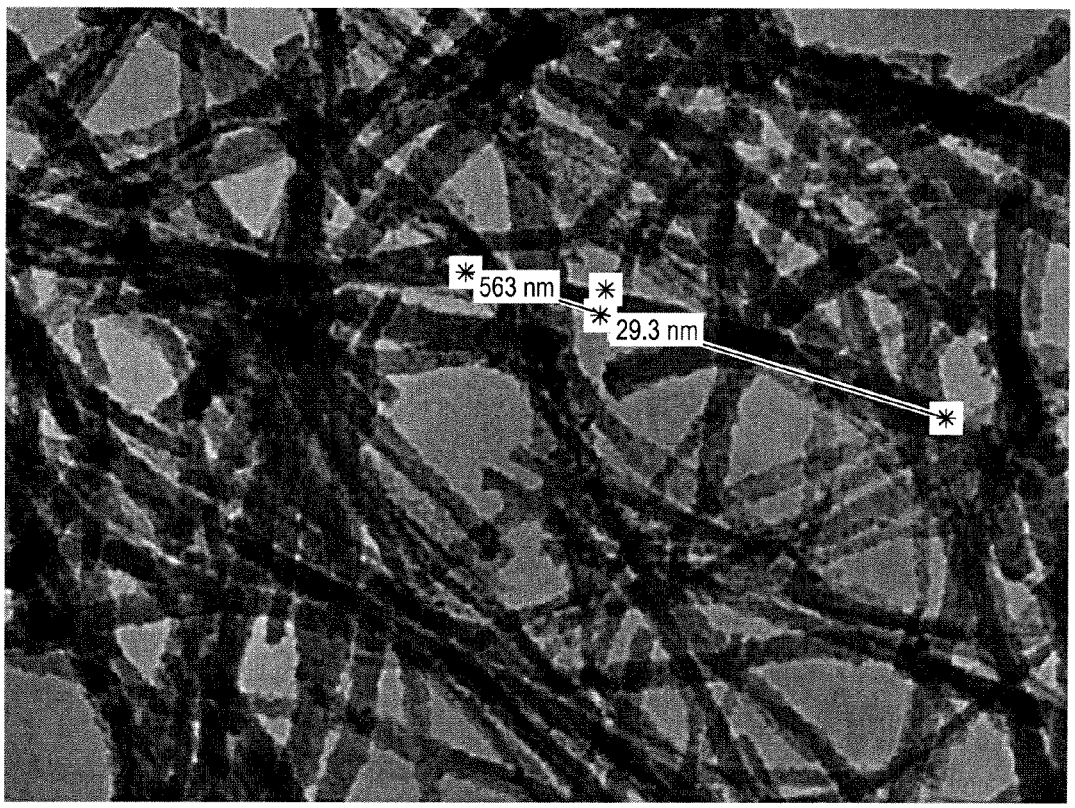
FIG. 5 is a micrograph (transmission electron microscopy) of representative photolytic devices fabricated: $V_3O_7.H_2O$ nanowires decorated with Au nanoparticles.

As stated earlier, $V_3O_7.H_2O$ nanowires have a multifunctional role in the present disclosure. In addition to being the light absorber and carrier transporter, $V_3O_7$ also serves as the reducer for the synthesis of plasmonic nanoparticles. An Au-decorated $V_3O_7.H_2O$ nanowire suspension was synthesized by mixing of 1 mL of $V_3O_7.H_2O$ nanowire suspension in water (3.4 g/L) with 1 mL of $HAuCl_4$ (0.002 M). This step is also shown in the process flow diagram of FIG. 4. FIG. 5 shows a micrograph of the $V_3O_7.H_2O$ nanowires decorated with Au nanoparticles. The Au nanoparticles are typically seen as darker "dots". For the synthesis of Ag nanoparticles, $HAuCl_4$ was replaced by $AgNO_3$. In addition, it may be necessary to expose the nanowire and metal salt solution to electromagnetic radiation to enable reduction of the nanoparticles on the nanowires by photochemical reduction.

Figure 6:
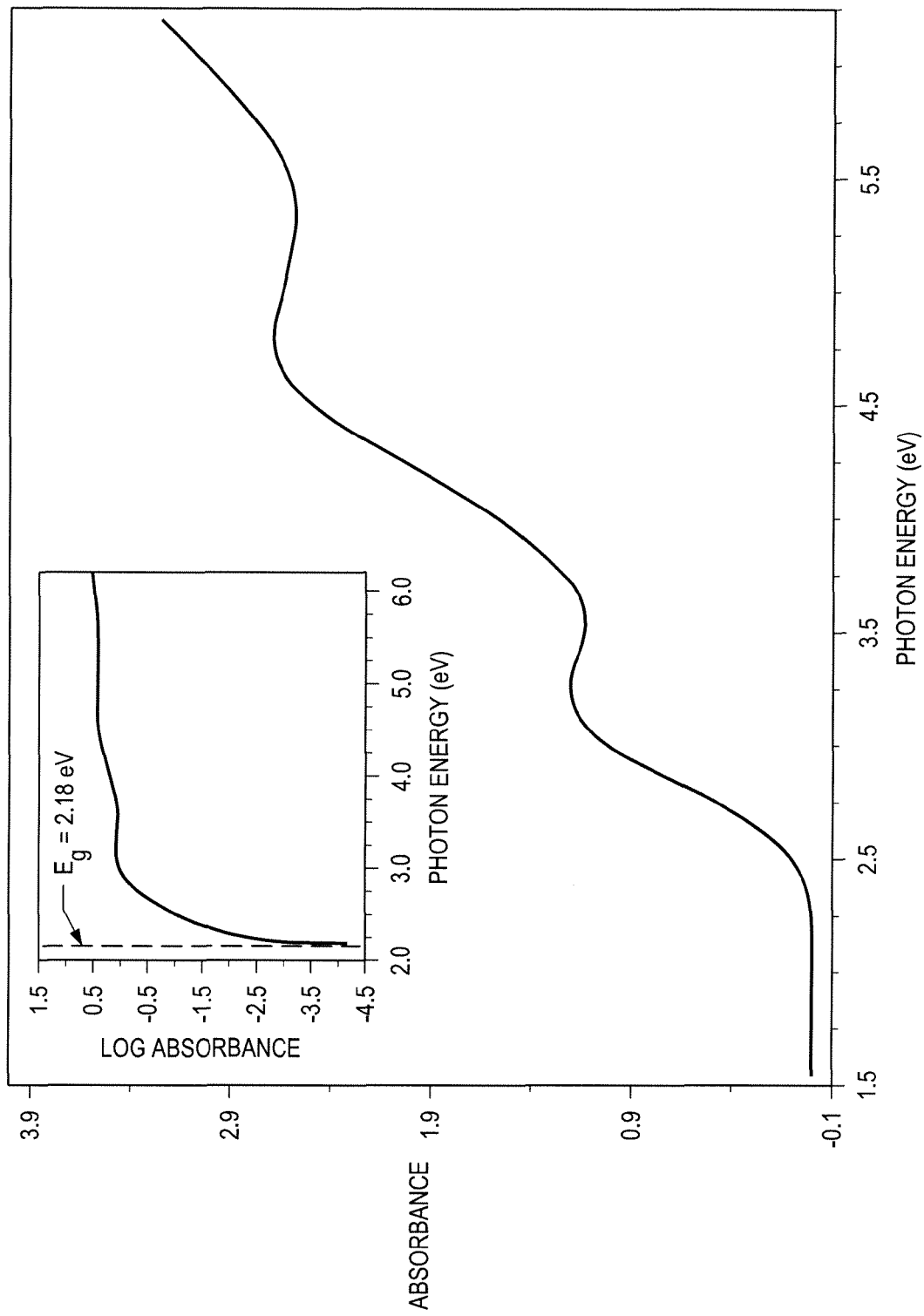
FIG. 6 is a plot of the optical absorbance of $V_3O_7.H_2O$ nanowires at concentration of 1.7 g/L in water, with inset showing the derivation of band gap from the asymptote of the semilog plot.

Referring now to FIG. 6, optical absorbance of the $V_3O_7.H_2O$ nanowires prior to metal nanoparticle synthesis is shown. A nanowire concentration of 1.7 g/L in water, from which band gap was deduced to be 2.18 eV is shown.

Figure 7:
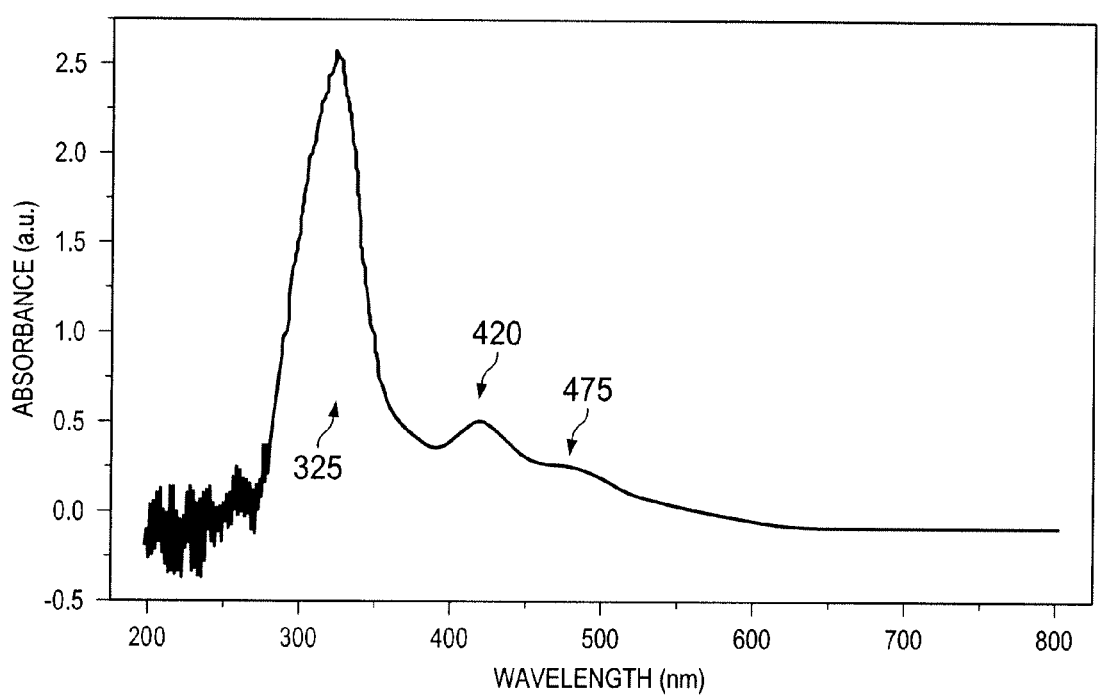
FIG. 7 is a plot illustrating additional absorbance in $V_3O_7.H_2O$ nanowires (0.34 g/L), when decorated with Au nanoparticles.

Referring now to FIG. 7, the additional (enhanced) absorbance in $V_3O_7.H_2O$ nanowires (0.34 g/L), when they are decorated with Au nanoparticles, is shown. Interestingly, multiple resonances are found with no coincidence with the localized surface plasmon resonance for Au nanoparticles (i.e. ~520 nm). This observation indicates that the peaks correspond to plasmonic nanoparticle—mediated coupling of light into waveguide modes in the $V_3O_7.H_2O$ nanowires.

Photolysis

Figure 8:
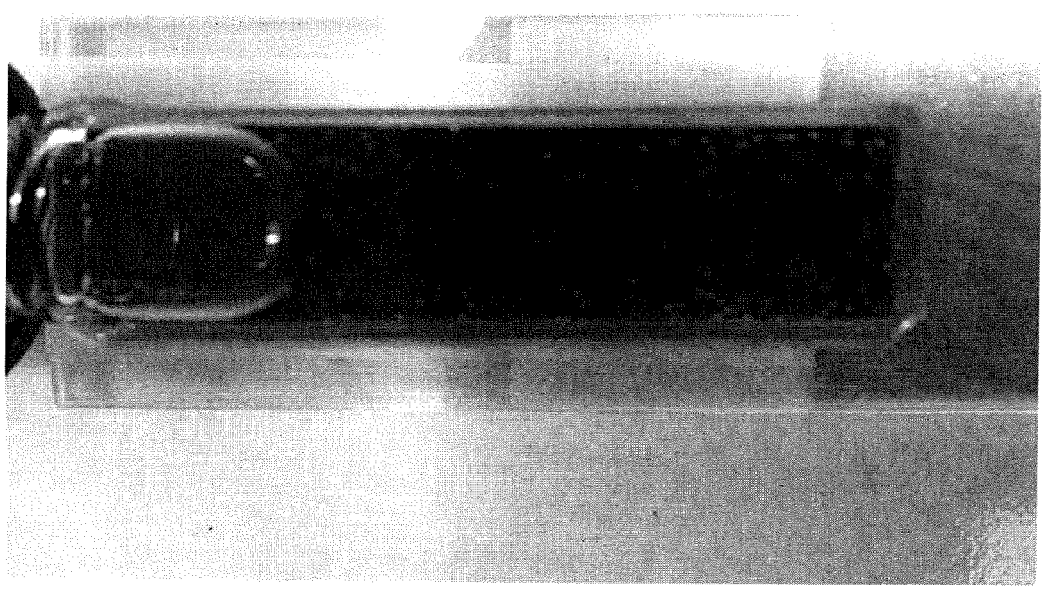
FIG. 8 is a photograph of nanowire-nanoparticle conjugate device suspension of the present disclosure exhibiting rapid gas bubbling under 470 nm radiation, which is indicative of photolysis.

Photolysis was performed in septum-sealed 4 mL UV-Vis optical cells enclosing the nanowire-nanoparticle conjugate device suspension. Photolysis was conducted under LED radiation of 405, 425, 470, 525, and 605 nm. In these demonstrations, the suspension was heated to 40° C. Rapid gas bubbling, as depicted in FIG. 8, was immediately observed once the LED radiation was turned on.

Prior to GC, the vial was filled with the nanowire-nanoparticle suspension leaving 1 mL air volume. Subsequently, the air was purged by argon for 10 min through a pair of needles piercing the septum making sure no air is left inside the vial. Next, the photolysis was started and continued for 30 min. For gas chromatography (GC) analysis, the photolysis was conducted with 470 nm LED irradiation at an incident power of 11 mW. Then, the vial was taken to the GC analysis, and then the collected gas mixture in the vial was injected to the GC system.

GC was performed using an Agilent Technologies Model 6890N Gas Chromatographer (GC). Samples are injected via a Hamilton 100 μL Syringe Model 1710SL, coupled to a GasTight 22s/2"/2 attachment, and 26s/2"/5 needle. The system utilizes a Supelco 1010 Capillary Column with dimensions 30 m×320 μm×15 μm (length×inside diameter×nominal film thickness) and uses argon as the carrier gas. A splitless inlet is used, which purges the flow at 12.1 mL/min at 1 minute into the testing. The GC has two separate systems for gas detection: the front detector using a Flame Ionization Detector (FID) and the back detector using a Thermal Conductivity Detector (TCD). For the detection of Hydrogen, a TCD is required, due to the widespread use of Hydrogen gas as the fuel in most FID units.

The crucial parameters for the testing were determined through multiple measurements, and gas volumes introduced into the system. The initial temperature ($T_i$) of the system was set at 32° C. and held for 12 minutes. Due to the interaction of the gas with the system, a ramp is used at a rate of 30° C./minute and final temperature ($T_f$) of 236° C. The flow rate of the carrier gas is initially 0.4 mL/min ramped to 0.8 mL/min at a rate of 0.1 mL/min². The total time required for one measurement is 20 minutes.

Figure 9A:
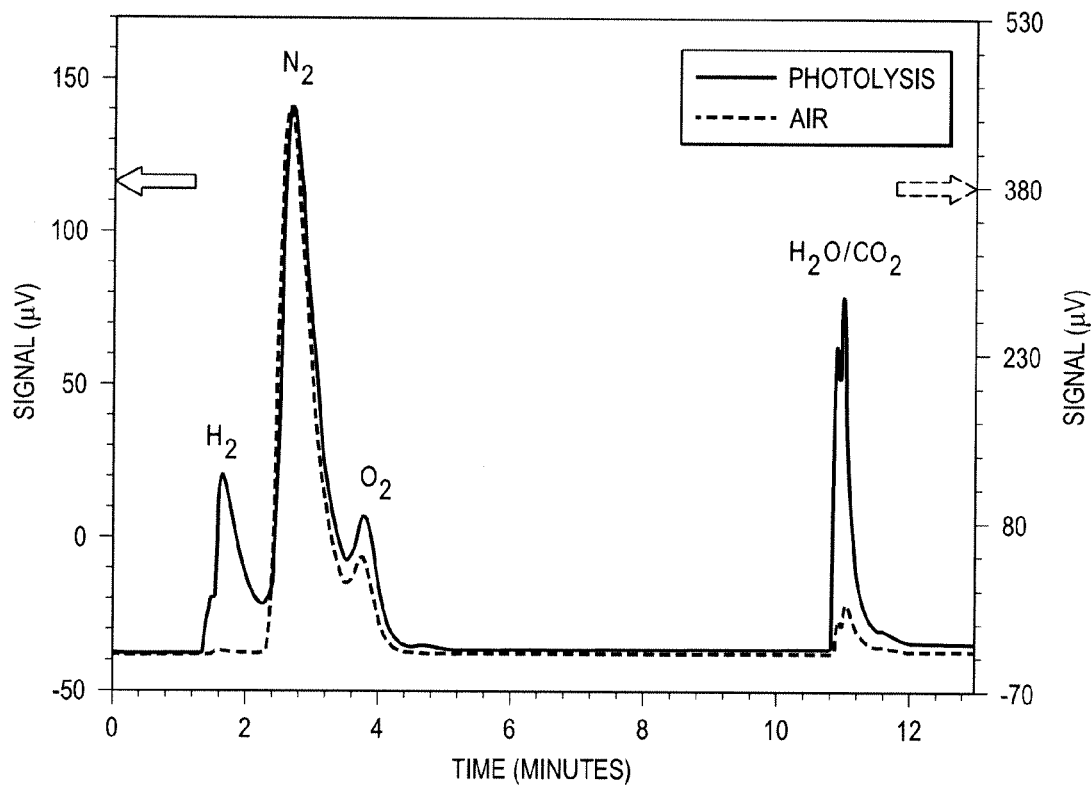
FIGS. 9A and 9B show the gas chromatography spectrum after injection of 250 μL of photolysis product obtained from nanowire-nanoparticle conjugate devices of the present disclosure.
Figure 9B:
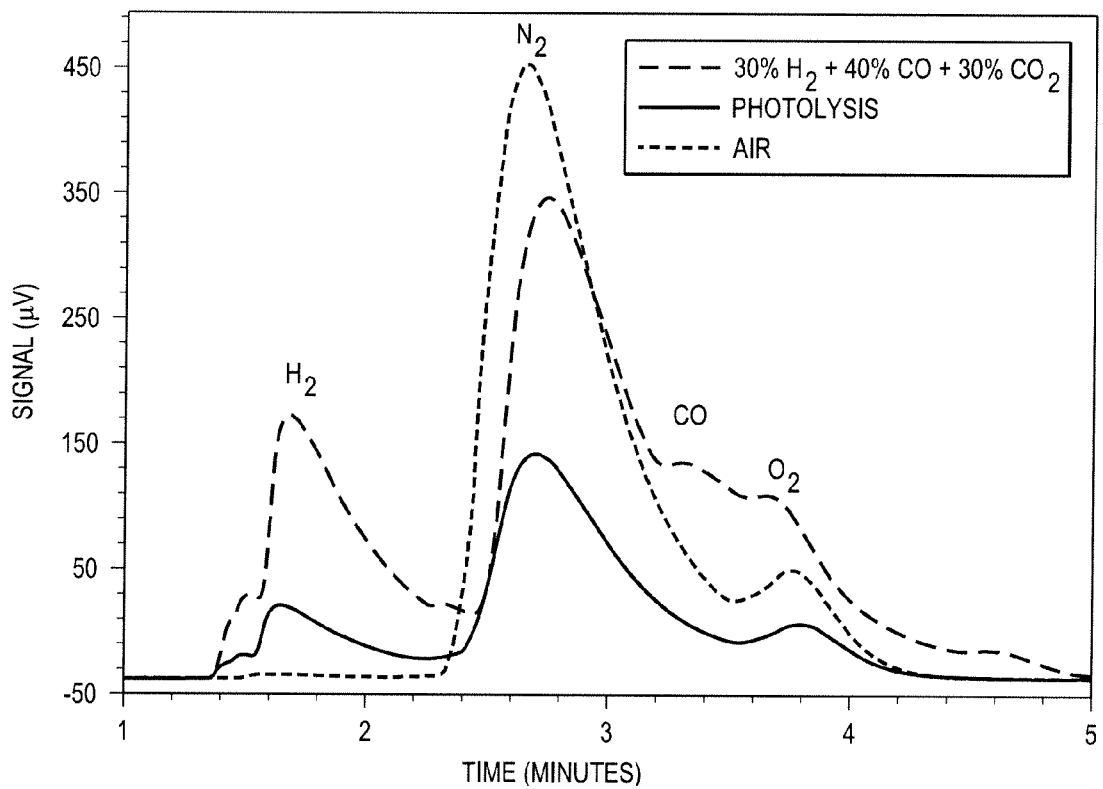

FIGS. 9A and 9B show the GC spectrum after injection of 250 μL gas from the photolysis vial. The spectrum was found to be highly reproducible after several photolysis batches with the same suspension or different suspensions. The assignments for the peaks are shown by peak labels in the spectra. For comparison, spectra of air and 30% $H_2$ (40% CO+30% $CO_2$) are also provided.

As different from the air, the photolysis sample shows the $H_2$ peak and a more intense moisture peak. The water peak is attributed to the evaporating water in the vial during photolysis. The $N_2$ in the photolysis sample is anticipated to be associated with the air, which occupies the dead volume of the gas syringe. Same is observed for the 30% $H_2$ reference sample, which intentionally contains no air. In the photolysis sample, the ratio of $O_2$ to $N_2$ is slightly larger compare to that in air. Higher ratio of $O_2$ in the photolysis sample is credited to splitting of water to both $H_2$ and $O_2$ during photolysis.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

REFERENCES

1. R. Eisenberg, "Rethinking water splitting," Nature 324, 44 (2009).
2. M. Gratzel, "Photoelectrochemical cells," Nature 414, 338 (2001).
3. C. A. Grimes, S. Ranjan, and O. K. Varghese, "Light, water, hydrogen," Springer Science+Business Media, LLC, New York, N.Y. 10013, USA (2008).
4. K. Rajeshwar, R. McConnell, and S. Licht, "Solar hydrogen generation: toward a renewable energy future," Springer Science+Business Media, LLC, New York, N.Y. 10013, USA (2008)
5. A. Fujishima and K. Honda, "Electrochemical photolysis of water at a semiconductor electrode," Nature 238, 37 (1972).
6. L. I. Halaoui, N. M. Abrams, and T. E. Mallouk, "Increasing the conversion efficiency of dye-sensitized TiO2 photoelectrochemical cells by coupling to photonic crystals," J. Phys. Chem. B 109, 6334 (2005).
7. O. K. Varghese, M. Paulose, K. Shankar, G. K. Mor, and C. A. Grimes, "Water-photolysis properties of micron-length highly-ordered titania nanotube-arrays," J. Nanoscience and Nanotechnology 5, 1158 (2005).
8. K. Kalyansundaram, "Photoelectrochemical cell studies with semiconductor electrodes—A classified bibliography (1975-1983)," Solar Cells 15, 93 (1985).

9. V. M. Aroutiounian, V. M. Arakelyan, and G. E. Shahnazaryan, "Metal oxide photoelectrodes for hydrogen generation using solar radiation-driven water splitting," Solar Energy 78, 581 (2005).
10. A. J. Bard and M. A. Fox, "Artificial photosynthesis: Solar splitting of water to hydrogen and oxygen," Acc. Chem. Res. 28, 141 (1995).
11. A. J. Bard, "Photoelectrochemistry and heterogeneous photocatalysis at semiconductors," J. Photochemistry 10, 59 (1979).
12. J. R. Bolton, "Solar photoproduction of hydrogen: A review," Solar Energy 57, 37 (1996).
13. S. Sato and J. M. White, "Photodecomposition of water over Pt/HO2 Catalysts," Chem. Phys. Lett. 72, 83 (1980).
14. G. N. Schrauzer and T. D. Guth, "Photolysis of water and photoreduction of nitrogen on Titanium dioxide," J. Am. Chem. Soc. 99, 7189 (1977).
15. L. Schlapbach, "Hydrogen-fuelled vehicles," Nature 460, 809 (2009).
16. M. S. Wrighton, D. S. Ginley, P. T. Wolczanski, A. B. Ellis, D. L. Morse, and A. Linz, "Photoassisted electrolysis of water by irradiation of a titanium dioxide electrode," Proc. Nat. Acad. Sci. USA 72, 1518 (1975).
17. H. H. Kung, H. S. Jarrett, A. W. Sleight, and A. Ferretti, "Semiconducting oxide anodes in photoassisted electrolysis of water," J. Appl. Phys. 48, 2463 (1977).
18. G. Campet, M. P. Dare-Edwards, A. Hamnett, and J. B. Goodenough, "New semiconducting anodes for the photooxidation of water," Nouveau Journal De Chimie—New Journal of Chemistry 4, 501 (1980).
19. H. Van Damme and W. Keith Hall, "On the photo-assisted decomposition of water at the Gas-Solid interface on $TiO_2$," Am. Chem. Soc. 101, 4373 (1979).
20. J. G. Mavroides, "Electrode materials for the photoelectrolysis of water," Mat. Res. Bull. 13, 1379 (1978).
21. X. Zhou, S. A. Dayeh, D. Aplin, D. Wang and E. T. Yu, "Direct observation of ballistic and drift carrier transport regimes in InAs nanowires," Appl. Phys. Lett. 89, 053113 (2006).
22. E. Borgarello, J. Kiwi, E. Pelizzetti, M. Visca, and M. Gratzel, "Sustained water cleavage by visible light," J. Am. Chem. Soc. 103, 6324 (1981).
23. E. Borgarello, J. Kiwi, E. Pelizzetti, M. Visca, and M. Gratzel, "Photochemical cleavage of water by photocatalysis," Nature 289, 158 (1981).
24. D. Duonghong, E. Borgarello, and M. Gratzel, "Dynamics of light-induced water cleavage in colloidal systems," J. Am. Chem. Soc. 103, 4685 (1981).
25. A. K. Kalkan and S. J. Fonash, "Laser-activated surface-enhanced Raman scattering substrates capable of single molecule detection," Appl. Phys. Lett., 89, 233103 (2006).
26. H. R. Stuart and D. G. Hall, "Absorption enhancement in silicon-on-insulator waveguides using metal island films," Appl. Phys. Lett. 69, 2327 (1996).
27. H. R. Stuart and D. G. Hall, "Island size effect in nanoparticles-enhanced photodetectors," Appl. Phys. Lett. 73, 3815 (1998).
28. H. R. Stuart and D. G. Hall, "Enhanced dipole-dipole interaction between elementary radiators near a surface," Phys. Rev. Lett. 80, 5663 (1998).
29. Y. Fang, H. Wei, F. Hao, P. Nordlander, and H. Xu, "Remote excitation surface enhanced raman scattering using propagating Ag nanowire plasmons," Nano Letters 9, 2049 (2009).
30. M. W. Knight, N. K. Grady, R. Bardhan, F. Hao, P. Nordlander, and N. J. Halas, "Nanoparticle mediated coupling of light into a nanowire," Nano Letters 7, 2346 (2007).
31. R. F. Oulton, V. J. Sorger, D. A. Genov, D. F. P. Pile, and X. Zhang, "A hybrid plasmonic waveguide for subwavelength confinement and long-range propogation," Nature Photonics 2, 496 (2008).
32. N. Leventis, C. Sotiriou-Leventis, S. Mulik, A. Dass, J. Schnobrich, A. Hobbs, E. F. Fabrizio, H. Luo, G. Churu, Y. Zhang, and H. Lu, "Polymer nanoencapsulated mesoporous vanadia with unusual ductility at cryogenic temperatures," J. Mater. Chem. 18, 2475 (2008).

What is claimed is:
1. A method of generating hydrogen comprising:
submersing vanadium semiconductor decorated nanowires decorated with plasmonic metallic nanoparticles into water, the plasmonic nanoparticles decorating the nanowires such that exposure to light outside the nanowire creates electron/hole pairs with the nanowire functioning as an anode and splitting water molecules into oxygen molecules and hydrogen ions using hole transfer, and the plasmonic metallic nanoparticles functioning as cathodes that transport the electrons to the hydrogen ions reducing them to hydrogen gas;
exposing the water submerged nanowires to light;
and collecting hydrogen gas produced by photolysis from the exposure to light.
2. The method of claim 1, wherein the metallic nanoparticles comprise gold.
3. The method of claim 1, wherein the metallic nanoparticles comprise silver.
4. The method of claim 1, wherein the metallic nanoparticles comprise copper.
5. The method of claim 1, wherein the metallic nanoparticles comprise platinum.
6. The method of claim 1, further comprising preparing semiconductor nanowires by supercritical drying of vanadia gel.
7. A system for production of hydrogen gas via hydrolysis comprising:
a water based medium;
a plurality of vanadium semiconductor nanowires in the medium; and
plasmonic nanoparticles decorating the nanowires such that exposure to light outside the nanowire creates electron/hole pairs;
wherein the nanowire functions as an anode and splits water molecules into oxygen molecules and hydrogen ions using hole transfer; and
wherein the plasmonic nanoparticles function as cathodes that transport the electrons to the hydrogen ions reducing them to hydrogen gas.
8. The system of claim 7, wherein the nanoparticles comprise gold.
9. The system of claim 7, wherein the nanoparticles comprise silver.
10. The system of claim 7, wherein the nanoparticles comprise copper.
11. The system of claim 7, wherein the nanoparticles have the characteristic of localized surface plasmon resonance.
12. The system of claim 7, wherein the nanoparticles couple the incident electromagnetic radiation to nanowire waveguide modes for optical absorption enhancement.
13. The system of claim 7, wherein the nanoparticles function as near field concentrators for enhancing the absorption of electromagnetic radiation in the nanowires.
14. A method of generating hydrogen from water by photolysis comprising:

preparing a plurality of vanadium semiconductor nanowires decorated with plasmonic nanoparticles functioning as near field concentrators enhancing the absorption of light in the nanowires;

immersing the plurality of nanowires in a water solution;

exposing the solution to light thereby creating electron/hole pairs in the nanowires, the nanowires functioning as anodes that split the water molecules into oxygen molecules and hydrogen ions using hole transfer and the plasmonic nanoparticles functioning as cathodes that transport electrons to reduce resultant hydrogen ions into hydrogen molecules.

15. The method of claim 14, wherein preparing a plurality of semiconductor nanowires further comprises supercritical drying of vanadia gel.

16. The method of claim 15, wherein preparing a plurality of semiconductor nanowires further comprises immersing the nanowires into a metallic salt solution.

17. The method of claim 14, wherein exposing the solution to light further comprises exposing the solution to solar radiation.

* * * * *